US009866955B2

(12) United States Patent
Kleijn et al.

(10) Patent No.: US 9,866,955 B2
(45) Date of Patent: Jan. 9, 2018

(54) ENHANCEMENT OF INTELLIGIBILITY IN NOISY ENVIRONMENT

(71) Applicant: GOOGLE INC., Mountain View, CA (US)

(72) Inventors: Willem Bastiaan Kleijn, Lower Hutt (NZ); Petko N. Petkov, Stockholm (SE)

(73) Assignee: GOOGLE LLC, Mountain View, CA (US)

( * ) Notice: Subject to any disclaimer, the term of this patent is extended or adjusted under 35 U.S.C. 154(b) by 256 days.

(21) Appl. No.: 14/466,565

(22) Filed: Aug. 22, 2014

(65) Prior Publication Data

US 2015/0055800 A1 Feb. 26, 2015

Related U.S. Application Data

(60) Provisional application No. 61/869,332, filed on Aug. 23, 2013.

(51) Int. Cl.
*H04B 15/00* (2006.01)
*H04R 3/00* (2006.01)
(Continued)

(52) U.S. Cl.
CPC ............ *H04R 3/002* (2013.01); *G10L 15/142* (2013.01); *G10L 15/20* (2013.01);
(Continued)

(58) Field of Classification Search
CPC ................ H04R 2403/03; H04R 3/002; H04R 2225/41; H04R 25/407; H04R 29/00;
(Continued)

(56) References Cited

U.S. PATENT DOCUMENTS 3,008,013 A * 11/1961 Walker .................. H04R 19/02
381/116
3,022,471 A * 2/1962 Mork ....................... H03G 5/26
327/414
(Continued)

OTHER PUBLICATIONS

Petko N. Petkov et al., "Maximizing Phoneme Recognition Accuracy for Enhanced Speech Intelligibility in Noise", IEEE Transactions on Audio, Speech and Language Processing, vol. 21, No. 5, May 1, 2013, pp. 1035-1045.
(Continued)

*Primary Examiner* — Lun-See Lao
(74) *Attorney, Agent, or Firm* — Young Basile Hanlon & MacFarlane, P.C.

(57) ABSTRACT

Provided are methods and systems for enhancing the intelligibility of an audio (e.g., speech) signal rendered in a noisy environment, subject to a constraint on the power of the rendered signal. A quantitative measure of intelligibility is the mean probability of decoding of the message correctly. The methods and systems simplify the procedure by approximating the maximization of the decoding probability with the maximization of the similarity of the spectral dynamics of the noisy speech to the spectral dynamics of the corresponding noise-free speech. The intelligibility enhancement procedures provided are based on this principle, and all have low computational cost and require little delay, thus facilitating real-time implementation.

10 Claims, 6 Drawing Sheets

(51) Int. Cl.
*G10L 21/0208* (2013.01)
*G10L 21/0364* (2013.01)
*G10L 15/14* (2006.01)
*G10L 15/20* (2006.01)
*G10L 15/22* (2006.01)

(52) U.S. Cl.
CPC ...... *G10L 21/0208* (2013.01); *G10L 21/0364* (2013.01); *G10L 2015/227* (2013.01)

(58) Field of Classification Search
CPC ... H04R 1/02; H04R 1/08; H04R 1/10; H04R 1/403; H04R 1/406; H04R 1/44; H04R 2201/107; H04R 2203/12; H04R 2225/43; H04R 2307/025; H04R 2410/05; G10L 21/0208; G10L 21/0364; G10L 15/20; G10L 19/24; G10L 19/26; G10L 2021/02168; G10L 21/02; G10L 15/142; G10L 15/22; G10L 2015/227
USPC ............ 381/94.1–94.5, 71.1–71.6, 312, 317, 381/56–58, 1, 92; 704/200, 226, 231, 704/233, 225
See application file for complete search history.

(56) References Cited

U.S. PATENT DOCUMENTS 3,106,609 A * 10/1963 Dusey ..................... H04R 3/12
330/198
3,497,637 A * 2/1970 Lawrence ............... A61F 11/04
381/23.1
8,180,064 B1 * 5/2012 Avendano ........... G10L 21/0232
381/71.1
9,208,766 B2 * 12/2015 Su ........................ H03G 3/3089

OTHER PUBLICATIONS

C. H. Taal et al., "A Speech PreProcessing Strategy for Intelligibility Improvement in Noise Based on a Perceptual Distortion Measure", IEEE Intl. Conf. on Acoustics, Speech, and Signal Processing, Mar. 25-30, 2012, pp. 4061-4064, Kyoto, Japan.
R. J. Niederjohn et al., "The Enhancement of Speech Intelligibility in High Noise Levels by High-Pass Filtering Followed by Rapid Amplitude Compression", IEEE Trans. on Acoustics, Speech and Signal Processing, vol. ASSP-24, No. 4, Aug. 1976, pp. 277-282.
T.C. Zorila et al., "Speech-in-noise intelligibilty improvement based on spectral shaping and dynamic range compression", InterSpeech, Sep. 9-13, 2012, Portland, Oregon.

* cited by examiner

ENHANCEMENT OF INTELLIGIBILITY IN NOISY ENVIRONMENT

The present application claims priority to U.S. Provisional Patent Application Ser. No. 61/869,332, filed Aug. 23, 2013, the entire disclosure of which is hereby incorporated by reference.

It is important to human communication that speech is intelligible. Modern telecommunications technology allows users to communicate from anywhere to anywhere and this has resulted in a strong increase of the negative impact of environmental noise on telecommunications. For example, a user may receive a call with a mobile phone in a train station, a cafe, a car, a bus, or in a busy street and not understand a word the other person is saying. Similarly, a user may be in an airport or train station and not understand the announcements, or the television may be on in a noisy environment such as a cafe and or an airport and the user is unable to understand what is being said. In yet another example, a user in a conference room may be trying to use the speaker phone but the room is noisy and it is difficult to understand what the other party is saying. In general, the problem is particularly severe when the speaking party is only vaguely aware of the noisy environment that the listener is in.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for processing audio signals. More specifically, aspects of the present disclosure relate to enhancing the intelligibility of speech in noisy environments.

One embodiment of the present disclosure relates to a method for enhancing intelligibility of a speech signal rendered in a noisy environment, the method comprising: adapting a sequence of features for a signal rendered in a noisy environment to approximate the sequence of features for the signal rendered in a noise-free environment; and imposing a constraint on each of the features for the signal rendered in the noisy environment, wherein a spectrum of the signal rendered in the noisy environment is a compressed version of the signal rendered in the noise-free environment.

In another embodiment, the sequence of features for the signal rendered in the noise-free environment is a sequence of spectral features, and the method for enhancing intelligibility of a speech signal further comprises using the sequence of spectral features for the signal rendered in the noise-free environment as a target for spectral features for the signal rendered in the noisy environment.

In another embodiment, the method for enhancing intelligibility of a speech signal further comprises adjusting a fixed gain of each frequency band of the signal to maximize intelligibility given the environmental noise, subject to a power constraint.

In yet another embodiment, the method for enhancing intelligibility of a speech signal further comprises defining a fidelity measure to approximate the sequence of features for the signal rendered in the noisy environment to correspond with the sequence of features for the signal rendered in the noise-free environment.

Another embodiment of the present disclosure relates to a system for enhancing intelligibility of a speech signal rendered in a noisy environment, the system comprising one or more processors, and a non-transitory computer-readable medium coupled to the one or more processors having instructions stored thereon that, when executed by the one or more processors, cause the one or more processors to perform operations comprising: adapting a sequence of features for a signal rendered in a noisy environment to approximate the sequence of features for the signal rendered in a noise-free environment; and imposing a constraint on each of the features for the signal rendered in the noisy environment, wherein a spectrum of the signal rendered in the noisy environment is a compressed version of the signal rendered in the noise-free environment.

In another embodiment, the sequence of features for the signal rendered in the noise-free environment is a sequence of spectral features, and the one or more processors in the system for enhancing intelligibility of a speech signal are caused to perform further operations comprising: using the sequence of spectral features for the signal rendered in the noise-free environment as a target for spectral features for the signal rendered in the noisy environment.

In yet another embodiment, the one or more processors in the system for enhancing intelligibility of a speech signal are caused to perform further operations comprising: adjusting a fixed gain of each frequency band of the signal to maximize intelligibility given the environmental noise, subject to a power constraint.

In yet another embodiment, the one or more processors in the system for enhancing intelligibility of a speech signal are caused to perform further operations comprising: defining a fidelity measure to approximate the sequence of features for the signal rendered in the noisy environment to correspond with the sequence of features for the signal rendered in the noise-free environment.

Still another embodiment of the present disclosure relates to a method for enhancing intelligibility of a speech signal rendered in a noisy environment, the method comprising: adapting a sequence of features for a signal rendered in a noisy environment to approximate the sequence of features for the signal rendered in a noise-free environment; and imposing a constraint on each of the features for the signal rendered in the noisy environment, wherein the sequence of features for the signal rendered in the noisy environment is adapted by adjusting a fixed gain of each frequency band of the signal to maximize intelligibility.

In one or more other embodiments, the methods and systems described herein may optionally include one or more of the following additional features: a spectrum of the signal rendered in the noisy environment is a compressed version of the signal rendered in the noise-free environment; the compression is optimized for each frequency band of the signal over time; the sequence of features are discrete log spectra or discrete linear spectra; a change in the sequence of features for the signal rendered in the noise-free environment corresponds to a change in the sequence of features for the signal rendered in the noisy environment; and/or the fixed gain of each frequency band of the signal rendered in the noisy environment is adjusted based on detected background noise in the noisy environment.

Embodiments of some or all of the processor and memory systems disclosed herein may also be configured to perform some or all of the method embodiments disclosed above. Embodiments of some or all of the methods disclosed above may also be represented as instructions embodied on transitory or non-transitory processor-readable storage media such as optical or magnetic memory or represented as a propagated signal provided to a processor or data processing device via a communication network such as an Internet or telephone connection.

Further scope of applicability of the methods and systems of the present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

BRIEF DESCRIPTION OF DRAWINGS

These and other objects, features, and characteristics of the present disclosure will become more apparent to those skilled in the art from a study of the following Detailed Description in conjunction with the appended claims and drawings, all of which form a part of this specification. In the drawings:

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Overview

Various examples and embodiments of the methods and systems of the present disclosure will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include other features not described in detail herein. Additionally, some well-known structures or functions may not be shown or described in detail below, so as to avoid unnecessarily obscuring the relevant description.

Embodiments of the present disclosure relate to enhancing the intelligibility of an audio (e.g., speech) signal rendered (e.g., played out) in a noisy environment, subject to a constraint on the power of the rendered signal. As will be further described herein, a quantitative measure of intelligibility is the mean probability of decoding of the message correctly. The methods and systems presented simplify the procedure by approximating the maximization of the decoding probability with the maximization of the similarity of the spectral dynamics of the noisy speech to the spectral dynamics of the corresponding noise-free speech. One or more embodiments relates to intelligibility enhancement procedures based on this principle, all of which have low computational cost and require little delay, thus facilitating real-time implementation. Preliminary experimental results confirm the effectiveness of the approach described herein.

As will be further described herein, the accurate reconstruction of the dynamics of the speech spectrum is important to intelligibility. This naturally leads to a distortion measure. Let dX represent a change in the spectrum of speech spoken in the clean signal. Let dY be the change in the spectrum of the noisy signal as observed by the listener. To preserve the changes in the noisy speech, dX=dY. For a particular frequency bin, it is desired to have dX/dY=1. So the distortion measure is the mean (expectation) over time and frequency of $(dY/dX-1)^2$.

The methods and systems described in the present disclosure aim to modify the rendered speech such that the resulting noisy observed speech minimizes this measure. Further, in accordance with at least one embodiment, the approach described herein aims to do this under a constraint on the energy or gain (since otherwise the solution would be to play out the signal very loud). For any enhancement strategy (e.g., adaptively changing the signal coloring, rewording the message, etc.) this leads to a mathematical problem, as further presented below.

For the practical enhancement method of changing the signal color to maximize intelligibility, there exists a number of solutions. Thus, there is a set of enhancement algorithms that continuously adapts to the noise background level, and provides state-of-the-art intelligibility enhancement for real-time environments. In accordance with one embodiment of the present disclosure, the spectrum of the signal rendered in noise may be a compressed version of the signal rendered in a noise-free environment, with the compressor being optimized continuously for each frequency band over time. In accordance with another embodiment, a fixed gain of each frequency band may be optimally adjusted to maximize the intelligibility given the environmental noise, subject to an overall power constraint. As will be described in greater detail herein, the methods provided adapt to the noise spectrum and do so instantly. Additionally, the methods may be implemented with very low complexity and very low time delay. As such, the methods and systems described herein may be implemented, for example, in a mobile phone.

Message Fidelity

Human-to-human communication conveys a message from the brain of one person to that of another person. For purposes of the present description, the message is considered to be a real-valued random variable t and the conveyance of the message is modeled as a Markov chain (it should be noted, however, that similar results can be obtained if the message is considered to be a discrete-valued random variable). Thus, the message t (note that random variables are denoted herein by bold symbols) may be converted to a sequence of words and associated prosody, and this sequence in turn may be converted to a sequence of spectra which, in turn, may be converted to an acoustic signal. The acoustic signal is contaminated by acoustic noise, and is then interpreted by the human auditory system as a sequence of spectra, a sequence of words and, finally a received message τ. In the following, it will be shown that this viewpoint naturally leads to practical methods for the enhancement of speech.

Consider a probabilistic model of speech production for a message t, which may correspond to a single utterance. The signal features (e.g., a sequence of spectra or cepstra) produced by the source may be described as a real-valued random vector X, the default speech production rules by P, and the adjustment of these rules by R (the rules are deterministic). The conditional density of the sequence of spectra can then be written as p(X|t, R, P).

A probabilistic decoding model can be defined similarly to the encoding model. Let V denote the decoding rules and let Y denote a random vector of noisy-speech features. The distribution of decoding the message as τ can then be written as p(τ|Y, V).

In general, the decoded message depends on the original message, the encoding and decoding rules, and the environmental noise. Exploiting the Markov model of the communication process, the following may be written:

$$p(\tau|t,N,P,R,V) = \int p(\tau|Y,V)p(Y|X,N)p(N)p(X|t,P,R) \, dXdYdN \quad (1)$$

The message fidelity, F, of the decoded message r in an environment characterized by features N may be defined as the mean negative distortion $d: N \times N \rightarrow R$ of the decoded message:

$$F(\tau,t) = -\int d(t,\tau)p(\tau|t,N,P,R,V)p(N)p(t)d\tau dt dN \quad (2)$$

A convenient distortion measure is the hit-or-miss distortion measure (e.g., cost function), $d(t, \tau) = -\delta(t, \tau)$. For this case the message fidelity becomes $$F_{HM}(\tau,t) = \int p(\tau=t|t,N,P,R,V)p(t)p(N)dt dN. \quad (3)$$

If the environment N density is sufficiently narrow, or if N is modeled as deterministic, then equation (3) may be written as $$F_{HM}(\tau,t) = \int p(\tau=t|t,N,P,R,V)p(t)dt. \quad (4)$$

Both equations (3) and (4) show that, for the hit-or-miss criterion, the message fidelity now correspond to the mean probability of accurate message decoding. By making the assumption that the speech production process is ergodic, then the integration in equation (4) may be approximated by a time-average over messages. It should be noted that ergodicity is reasonable for both single-talker and multi-talker scenarios.

To see if it is possible to measure the message fidelity, equation (4) may be rewritten for the case that adaptations to the noisy environment are made on a signal X̌ rendered under noise-free assumptions. First, the approximation that Y is a deterministic function of X and N may be made. Then equation (4) may be written as $$F_{HM}(\tau,t) = \int p(\tau=t|Y,V)p(X|t,P,R)p(t)dXdt, \quad (5)$$

Then equation (5) can be narrowed down so that it applies to modifications to a rendering (e.g., a signal) intended for noise-free conditions:

$$\mathcal{F}_{HM}(\tau, t) = \int p(\tau = t | Y, \mathcal{V})p(X | \check{X}, \mathcal{R}) \quad (6)$$
$$p(\check{X} | t, \mathcal{P})p(t)dXd\check{X}dt$$
$$= E_{t,\check{X}}\left[p(\tau = t | Y, \mathcal{V})p(X | \check{X}, \mathcal{R})\right].$$

where X̌ describes the features of the signal produced using the noise-free condition with the basic production rules P. It is important to note that similar, but different, specialized versions of equation (5) can be written down for other signal modification strategies, such as, for example, choosing from a set of rephrasings in text-to-speech, or for modifying the pronunciation of particular vowels. Modifications of renderings aimed at noise-free conditions are particularly natural for the modification of live speech.

When the fidelity is written as in equation (6), it is readily seen that the fidelity can be evaluated accurately with an automatic speech recognizer under reasonable conditions. The mapping p(X|X̌, R) is generally a deterministic mapping, eliminating the integral over X and replacing (with abuse of notation) Y(X, N) with Y(X̌, N, R).

Assuming ergodicity, the averaging over p(X̌|t, P)p(t) can be replaced by a simple time averaging. Thus, the problem of optimization of the sound rendering for maximum intelligibility is reduced to finding the modification rules R that result in the maximum average for the probability of recognition for the original message p(τ=t|Y, V), which can be evaluated using an automatic speech recognizer.

Simplifying Message Fidelity

While the method described above provides good improvement in intelligibility in a background noise, the evaluation of the message fidelity requires high computational effort and is difficult to apply for real-time applications. Accordingly, the following describes various simplifications to the method that alleviate such disadvantages.

The fidelity measure described above uses an automatic speech recognizer to evaluate the probability p(τ=t|Y, V). In a typical hidden Markov model (HMM) based speech recognition system, the noisy-speech features Y for the message are a sequence of cepstra, and so-called delta-cepstra, and delta-delta cepstra (although so-called mel cepstra are generally used to reflect the frequency resolution of the auditory system, this level of specificity is omitted for purposes of brevity). As referred to herein, the delta cepstra are the differences between successive updates of the cepstra in time, and the delta delta cepstra are the differences of the differences between successive updates. The emission probability of the HMMs (e.g., the distribution of the observations given the state) is commonly modeled by a Gaussian mixture distribution.

In an existing implementation, the state sequence is held fixed when the rules R are adapted to maximize equation (6). As such, one objective of the method described herein is to adjust the features X such that the noisy features Y maximize the product of the emission probabilities for the sequence of samples. It should be noted that the optimization can be performed even for signals rendered in a noise-free environment, leading to an optimized signal that differs from the basic noise-free rendering by either a human or a machine.

The feature vector sequence X̌ of the noise-free rendering provides good intelligibility in a noise-free environment. Then a simplified approach to intelligibility enhancement can use the features of the noise-free rendering X̌ as a target for the noisy features Y obtained with the modified features X. For a homoscedastic HMM, it is natural to use a squared error criterion weight for the feature vector with the inverse of the covariance matrix. While such a simplified approach may be more restrictive than the method based directly on equation (6), as it cannot exploit the shape of the emission probability, this simplified method does account for the choice of the features used (e.g., generally cepstra, delta cepstra, and delta delta cepstra).

The following defines the ideal adaptation Y(X, N, R) to sustain intelligibility in a noisy environment, in accordance with one or more embodiments of the present disclosure. To avoid signal modifications that affect signal loudness unduly, any adjustment to the signal modification process should be subject to a constraint on the gain or on the signal power. A practical objective then is to adapt the sequence of absolute, delta, and delta-delta cepstra vectors for the noisy signal, Y, to approximate the same sequence for the signal rendered in a noise-free environment, $\check{X}$, by modifying X, subject to a power or gain constraint on X. To eliminate any effect from channel gain (from, for example, a telecommunication system, the room response, variation in human speech production, etc.), the cepstra may be subjected to cepstral mean normalization. This means that the objective becomes:

$$dY = d\check{X} \quad (7)$$

where Y are the noisy-speech features and $\check{X}$ are the features of speech rendered for a noise-free condition. Equation (7) implies that any change in the features as rendered in a noise free environment corresponds to a similar change in the noisy-speech features if enhancement is present. This means the delta (and delta-delta) cepstra of the adapted noisy-speech features are identical to the noise-free-rendered-speech features. Since discrete log spectra are a unitary transform of the cepstra, this also means that changes in the log spectra are also identical in the adapted noisy-speech features and the noise-free-rendered-speech features.

While the equality of equation (7) is desirable, in practice such equality can only be approximated. Accordingly, a fidelity measure needs to be defined that can replace $p(\tau=t|Y, V)$ in equation (6) and makes this approximation. An appropriate criterion that facilitates analytic manipulation for a particular sequence is the fidelity measure:

$$\mathcal{F}(Y, \check{X}) = -\sum_{j \in \mathcal{J}} \sum_{i \in \mathcal{I}} \left( \frac{dY_{j,i}}{d\check{X}_{j,i}} - 1 \right)^2, \quad (8)$$

where j sums over the feature vectors in the sequence J and i sums over the vector elements of the individual vectors. The minus sign in equation (8) means that the measure is a fidelity measure.

The fidelity measure of equation (8) applies to particular sequences, and for many applications a mean fidelity such as that of equation (6) may be needed. It is noted that for stationary sequences the summation over j can be omitted in equation (8). Thus, if $p(\tau=t|Y, V)$ is replaced in equation (6) by equation (8), the mean fidelity for a particular channel i may be written as $$\mathcal{F}(Y_{\cdot,i}, \check{X}_{\cdot,i}) = -\int \int \left( \frac{dY_{\cdot,i}}{d\check{X}_{\cdot,i}} - 1 \right)^2 p(\check{X}|t, \mathcal{P}) p(t) d\check{X}_{\cdot,i} dt \quad (9)$$

-continued $$= -\int \int \left( \frac{dY_{\cdot,i}}{d\check{X}_{\cdot,i}} - 1 \right)^2 p(\check{X}|\mathcal{P}) d\check{X}_{\cdot,i},$$

where the subscript "•" indicates an arbitrary j. The hit-or-miss based fidelity criterion (e.g., equation (6)) has now been approximated with a fidelity measure that has a simple and straightforward dependency on the features.

Intelligibility Enhancement Algorithms

In general, a noisy environment with features N results in an increase of the noisy features Y and the fidelity measure (equation (9), described above) can trivially be satisfied by making the rendered features X sufficiently large to make the contribution of the noise negligible. However, such loud renderings are generally undesirable and can be prevented by imposing suitable constraints on the signal power. The following describes the underlying operational principles of the methods and systems of the present disclosure, as well as analytic solutions.

Overview of the Algorithms

In accordance with one or more embodiments of the present disclosure, the algorithms described below perform nonlinear mappings on the features: they map a set of features produced under noise-free conditions into a set of features that are effective under noisy conditions. Because of the nonlinearity of these mappings, it is particular importance that the features used reflect the operation of the human auditory system properly.

The human auditory system can be modeled as a filter bank (e.g., a resolution that decreases with increasing frequency followed by half-wave rectification and an adaptive gain). If any of the algorithms described herein affect the individual filters of the auditory filter bank separately, then their effect on the auditory system is straightforward to evaluate. For this reason, one or more embodiments consider a discrete mel scale or ERB (equivalent rectangular bandwidth) scale log power spectrum as the basic feature set (as with cepstra in the above description, in the present description omits mel and ERB for brevity).

As discussed before, cepstra are commonly used in automatic speech recognition. The cepstra and the log spectrum form unitary transforms of each other. The cepstra are the coefficients of a cosine-basis expansion of the log spectrum. Omitting the higher-order cepstras is equivalent to smoothing the log spectra, and this motivates the use of cepstra for automatic speech recognition. A nonlinear mapping on a single cepstrum coefficient affects all filters of the filter bank of the human auditory system. This makes it difficult to evaluate the impact of such a mapping. This reconfirms the choice of discrete log spectra (or discrete linear spectra) for the feature representation, in accordance with the methods and systems described herein.

A range of constraints can be imposed to obtain a practical method for intelligibility enhancement based on equation (9). The simplest approach is to impose a constraint on each feature individually. However, it is also possible to impose global feature constraints.

Figure 1:
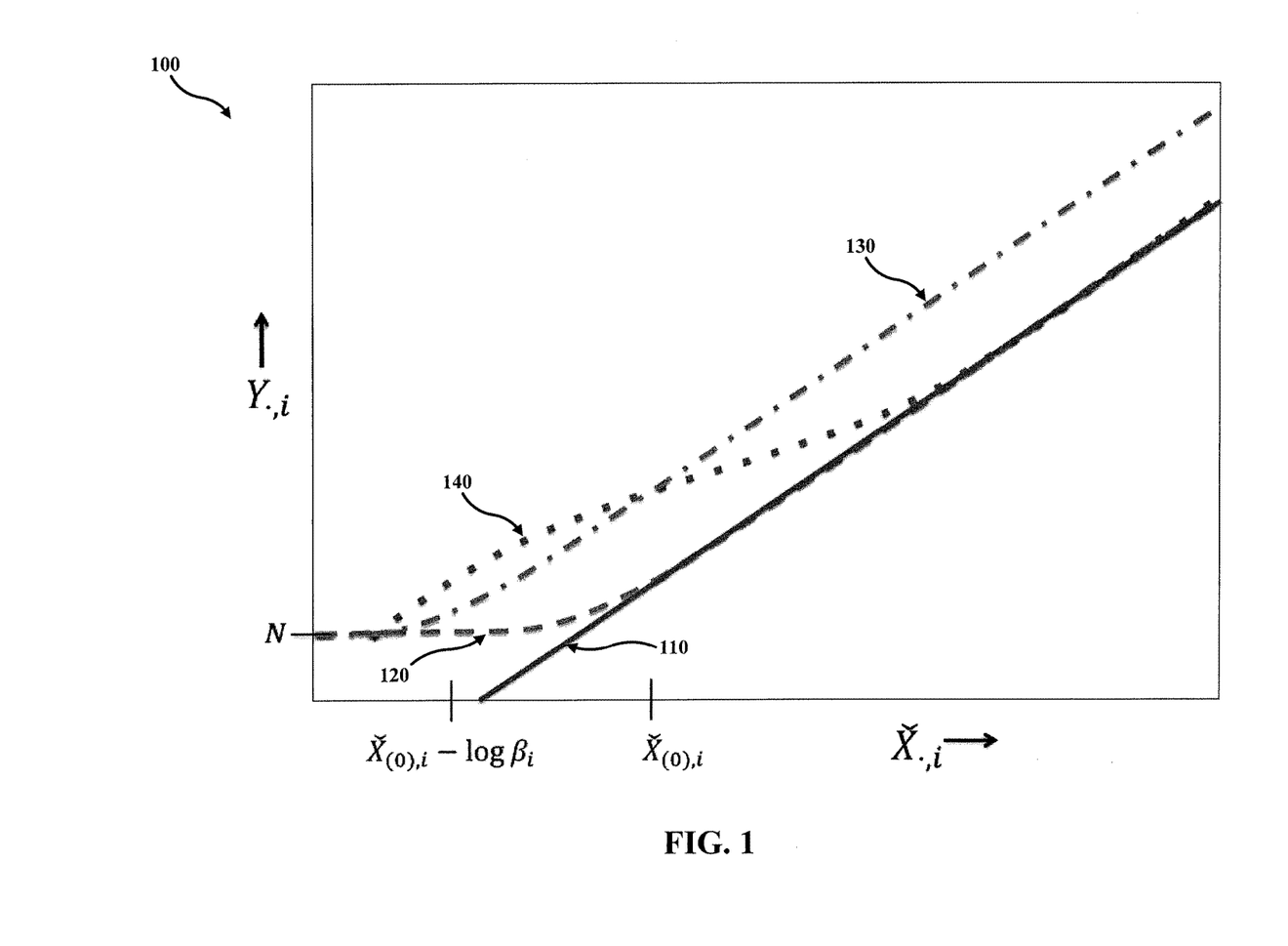
FIG. 1 is a graphical representation illustrating example behavior between a feature of an audio signal for no-noise rendering and an observed feature of the signal in a frequency bin of a discrete log spectrum according to one or more embodiments described herein.

FIG. 1 illustrates example relations between the feature for no-noise rendering, $\check{X}_{\cdot,i}$ and the observed feature $Y_{\cdot,i}$ in frequency bin i of a discrete log spectrum. The horizontal axis of the graphical representation 100 shows the value of $\check{X}_{\cdot,i}$ and the vertical axis shows $Y_{\cdot,i}$. The solid line (110) shows the single-channel rendering in a noise-free environment, where $Y_{\cdot,i} = \check{X}_{\cdot,i}$. The dashed curve (120) shows the case of a noisy environment without any enhancement for a noise level $N_{\bullet,i}$ in the band i. The dynamics of the signal are inaudible in channel i for $\check{X}_{\bullet,i} < \check{X}_{(0),i}$. A straightforward technique to make the signal more intelligible is to multiply the signal by a gain $\beta_i$. The features then become audible for $\check{X}_{\bullet,i} < \check{X}_{(0),i} - \log(\beta_i)$, which is illustrated by the dash-dotted curve (130). However, this results in an unnecessarily large power gain as loud speech components will receive the same power increase as low-power speech components.

A natural constraint is to bound the overall rendered signal power. To this purpose it is noted that the need for increased loudness is strongest for frequency bins where speech has a low power level relative to the noise level. In accordance with one or more embodiments described herein, it is possible to distribute the signal power across the frequency bins i∈I to maximize the fidelity measure (equation (9)), summed over the channels, subject to an overall power constraint. To fine-tune perceptual performance, biases may be applied to the individual frequency bins. Such an approach is described in greater detail below.

In accordance with one or more other embodiments of the present disclosure, constraints can also be applied to individual channels. Two types of constraints are natural. In the first constraint, the rendered power is bound in each channel. In the second constraint the noisy power is asymptotically equal to the signal power as rendered in a noise-free environment: $\lim_{\check{X} \to \infty} Y_{\bullet,i} = \check{X}_{\bullet,i}$. This case is illustrated in FIG. 1 by the dotted line (140). Again, to fine-tune perceptual performance, biases can be applied to the individual frequency bins. The single-channel approach is discussed in greater detail below.

Example Single-Channel Solutions

In accordance with one or more embodiments of the present disclosure, the calculus of variations may be used to find the optimal rules R in $Y(\check{X}, N, R)$. It may be assumed that the channels can be treated independently, which means that for a channel i the noisy features $Y_{\bullet,i}$ depend only on the variables in that channel and it can be written $Y_{\bullet,i}(\check{X}_{\bullet,i}, N_{\bullet,i}, R)$. The actual discrete log power spectrum rendered can be computed from the results as $$X_{\bullet,i} \leq \log(e^{Y_{\bullet,i}} - e^{N_{\bullet,i}}) \quad (10)$$

since the environmental noise and the rendered signal are independent at a signal level. In accordance with at least one embodiment, the case where the environmental noise is stationary may be considered, which means that the discrete noise spectrum n can be treated as a deterministic parameter in the present context (in contrast the random variable x varies across signal blocks).

To facilitate analytic solutions, the following mapping is introduced: $f: \mathbb{R} \to \mathbb{R}$. The variables in the mapped domain may be denoted with lower case symbols (e.g., $\check{x}_{\bullet,i} = f(\check{X}_{\bullet,i})$). Because the following examples address individual channels, and to reduce notational clutter, the following description omits the subscripts "•,i" and also the rule symbols R and P where this is obvious from the context. Thus, $Y_{\bullet,i}(\check{X}_{\bullet,i}, N_{\bullet,i}, R)$ may be reduced to $y(\check{x}, n)$ after the mapping. In applying the fidelity measure (equation (6)), the mapping is not compensated for. Instead, it is assumed that the measure is appropriate for the mapped domain.

The constraint on the rendered signal feature x may be written in the convenient form $$\int g(y) p(\check{x}) d\check{x} = 0, \quad (11)$$

where $g: \mathbb{R} \to \mathbb{R}$. It is now straightforward to use the method of Lagrange multipliers to introduce the constraint (equation (11)) to the maximization of the fidelity measure (equation (9)). The Lagrangian is now $$\Lambda(y,\check{x}) = \int (\lambda g(y) - (\dot{y} - 1)^2) p(\check{x}) d\check{x}, \quad (12)$$

where $$\dot{y} = \frac{dy}{d\check{x}}$$

and $\lambda$ is the Lagrange multiplier. The Euler-Lagrange equation is $$\lambda p(\check{x}) \frac{\partial g(y)}{\partial y} + 2 \frac{d(p(\check{x})(\dot{y} - 1))}{d\check{x}} = 0 \quad (13)$$

or, equivalently $$\lambda p(\check{x}) \dot{g}(y(\check{x})) + 2\dot{p}(\check{x}) \dot{y}(\check{x}) + 2p(\check{x}) \ddot{y}(\check{x}) - 2\dot{p}(\check{x}) = 0 \quad (14)$$

The following describes the mapping f and then a set of single-channel solutions obtained under different boundary conditions and constraints.

Selecting an Operating Domain: The mapping f is performed to facilitate analytic solutions. The mapping f is injective so that it can be inverted and selected so that the fidelity criterion (equation (9)), when specified in the mapped domain, is still meaningful.

It should be noted that it is convenient if the data density $p(\check{x})$ is uniform, as the middle term vanishes in that case. Thus, an attempt is made to find mappings that lead to a uniform distribution. Operating in the log spectrum, it is convenient to define the linear spectral amplitude (absolute spectrum) $s = e^{\mu_2 \check{X}}$, where $\mu_2$ determines the base of the exponential.

The trivial mapping $$\check{x} = f(\check{X}) = \check{X} = \frac{1}{\mu_2} \log(\check{s})$$

the uniform density on [0, a] for $\check{x}$ corresponds to a density of shape $$p(\check{s}) \sim \frac{1}{\check{s}} \text{ on } [1, e^a]$$

for the spectral amplitude $\check{s}$. This density $p(\check{s})$ has an infinite variance, which makes it physically unreasonable.

Laplacian distributions of the spectral amplitude are often reasonable. Such a distribution can be mapped onto a uniform distribution using the compander $$\check{x} = f(\check{X}) = 1 - e^{-\mu_1 e^{\mu_2 \check{X}}} = 1 - e^{-\mu_1 \check{s}}. \quad (15)$$

Figure 2:
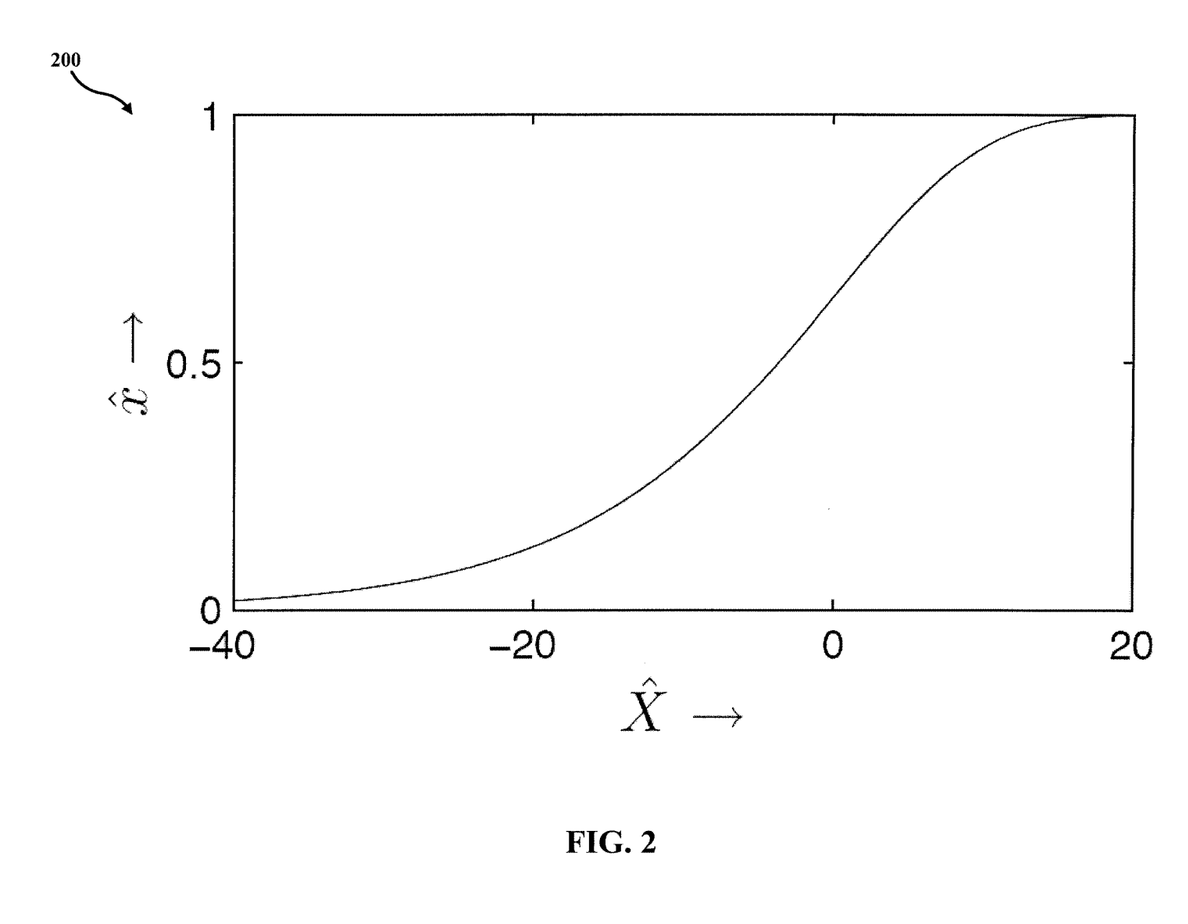
FIG. 2 is a graphical representation illustrating an example mapping of a probability distribution of spectral amplitude onto a uniform distribution using a compander according to one or more embodiments described herein.

The range of this mapping is [0, 1]. A uniform density of $\check{x}$ on [0, a], with $0 \leq a \leq 1$ corresponds to an exponentially decaying density $p(\check{s}) = e^{-\mu_1 \check{s}}$ on $[0, 1-e^{-a}]$ for the spectral amplitude $\check{s}$. FIG. 2 is a graphical representation 200 illustrating an example of the mapping.

In addition to the mapping of equation (15) having the advantage that a uniform distribution in $\check{x}$ corresponds to an exponential distribution in $\check{X}$, the mapping also has other important advantages. For example, the mapping (equation (15)) progressively down-weights the importance of the criterion for high and low values of $\check{X}$, which is desirable. Thus, errors will tend to be concentrated at high and low values of $\check{X}$. Importantly, this means that if the boundary conditions for the solution of the Euler-Lagrange equation lead to a large error, this error will be relatively small in the mid-region that generally is most important for perception. As will be described in greater detail below, in practice this means that the solution without constraint provides desirable behavior.

In accordance with one or more embodiments of the present disclosure, straightforward variations on the mapping themes described above lead to the following additional example solutions.

Example Solutions: The following provides a number of example analytic solutions. The first four example solutions described below are based on the assumption of a uniform distribution, which can be combined with the compander (equation (15)). The fifth example solution is found in the absolute spectrum domain.

(a) Uniform Distribution, No Constraint. The first example solution addresses the case where no constraint is imposed: $g(\check{x})=0$. It should be noted that the mapping f together with the boundary conditions determines the behavior of the solution, effectively replacing the constraint. If the mapping of equation (15) is used, this results in desirable behavior.

In accordance with at least one embodiment, the problem may be defined as: find the solution for equation (37) (presented below) on [0, 1] with $$p(\check{x}) = \begin{cases} 1, & \check{x} \in [0, a] \\ 0, & \text{otherwise} \end{cases} \quad (16)$$

$$y(0) = n + b, \quad (17)$$

$$y(a) = d, \quad (18)$$

$$g(\check{x}) = 0, \quad (19)$$

where b is an adjustable parameter that determines the severity of the low-power enhancement. It can be used to bias the individual channels.

The Euler-Lagrange equation is now of the form $$\ddot{y}=0 \quad (20)$$

and the general solution is of the form $$y = c_0 + c_1 \check{x} \quad (21)$$

which, with the boundary conditions imposed becomes $$y = n + b + \frac{d-n-b}{a}\check{x} \quad (22)$$

Figure 3:
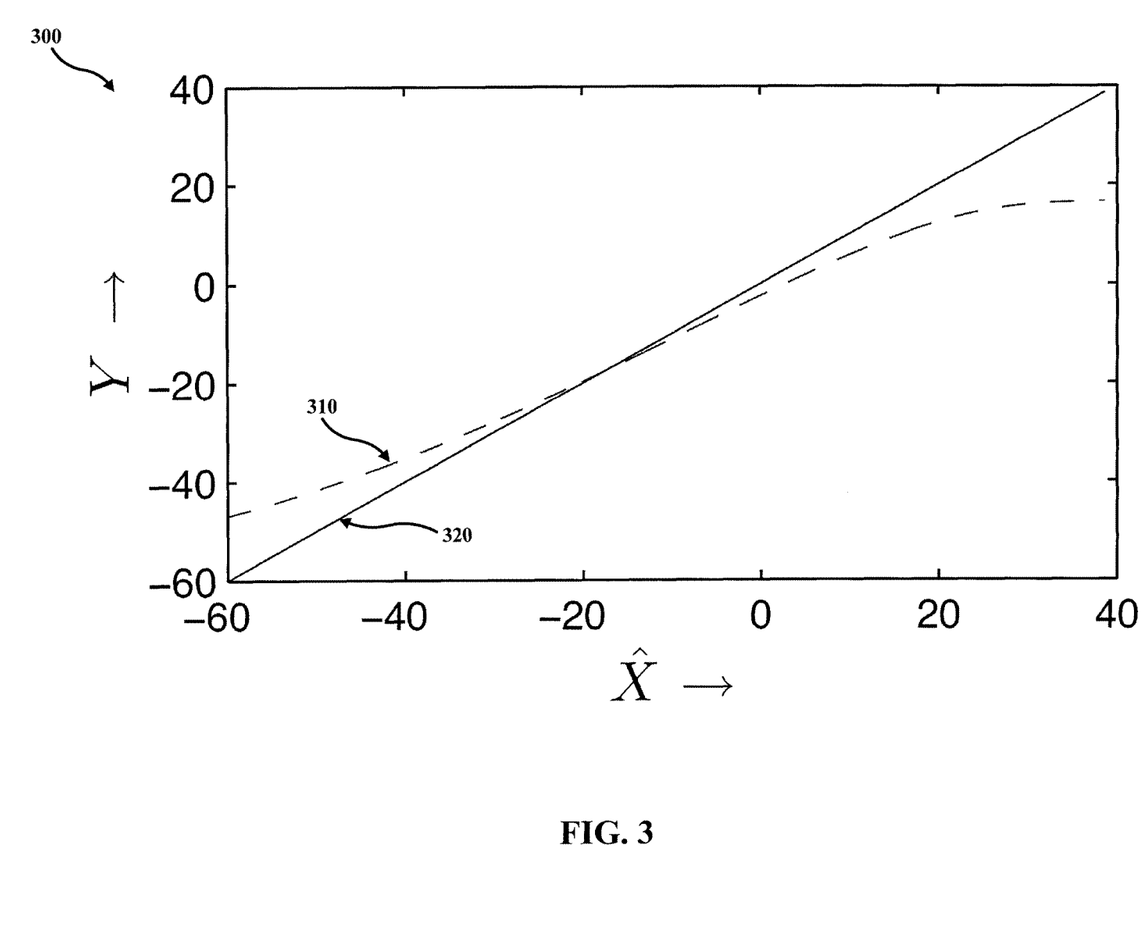
FIG. 3 is a graphical representation illustrating an example of a single channel solution for an intelligibility enhancement method according to one or more embodiments described herein.

The error in the slope $$\frac{d-n-b}{d} - 1$$

is uniform across the range of $\check{x}$ and depends only the boundary values. FIG. 3 is a graphical representation 300 illustrating an example of the relation of equation (22) in the log spectral domain $\check{X}$: the solution is a noise-adaptive compander. The solid line (320) shows Y=$\check{X}$ and the dashed line (310) shows the mapping for the case that $\lambda=5$, $\mu_1=1$, $\mu_2=0.05$, $\alpha=1$, d=0.9, n=0.05, $b_0=b_1=0$. The boundary condition y(d)=0.9 results in a smooth bounding of the value of Y, which is a direct result of the favorable properties of the compander (equation (15)). The features of the rendered features X can be computed with equation (10).

(b) Uniform Distribution, Constraint on Mean Distance from Noise-Free Rendering. This example solution considers the case where the mapping f is selected such that the density p is uniformly distributed over an interval in the log power domain and that the penalty for deviating from y=$\check{x}$ is also uniform. For the present case, the penalty for deviating from y=$\check{x}$ being uniform is relative high for low $\check{x}$.

In accordance with at least one embodiment described herein, the problem may be defined as: find the solution for equation (37) (presented below) on [0, a], 0<a≤1 with $$p(\check{x}) = \begin{cases} 1/a, & \check{x} \in [0, a] \\ 0, & \text{elsewhere} \end{cases} \quad (23)$$

$$y(0) = n + b_0 \quad (24)$$

$$y(a) = d \quad (25)$$

$$g(y) = -(y - \check{x} + b_1)^2. \quad (26)$$

where $b_0$ and $b_1$ are adjustable parameters that determine the strength of the low-power enhancement and the desired gain, respectively.

The Euler-Lagrange equation becomes $$2\lambda(y-\check{x}+b_1)-2\ddot{y}\leq 0 \quad (27)$$

or $$\lambda y - \ddot{y} = \lambda(\check{x}-b_1). \quad (28)$$

The general solution to the homogeneous solution is $$y_{(h)}(\check{x}) = c_0 e^{-\lambda \check{x}} + c_1 e^{\lambda \check{x}} \quad (29)$$

and a particular solution is $$y_{(p)}(\check{x}) = \check{x} - b_1 \quad (30)$$

The complete solution is of the form $$y(\check{x}) = \check{x} - b_1 + c_0 e^{-\lambda \check{x}} + c_1 e^{\lambda \check{x}}. \quad (31)$$

In view of the above, the final solution may be determined as $$y(\check{x}) = \check{x} - b_1 + \frac{d + b_1 - a - (n + b_0 + b_1)e^{\lambda a}}{e^{-\lambda a} - e^{\lambda a}} e^{-\lambda \check{x}} + \left(n + b_1 - \frac{d + b_1 - a - (n + b_0 + b_1)e^{\lambda a}}{e^{-\lambda a} - e^{\lambda a}}\right)e^{\lambda \check{x}} \quad (32)$$

Figure 4:
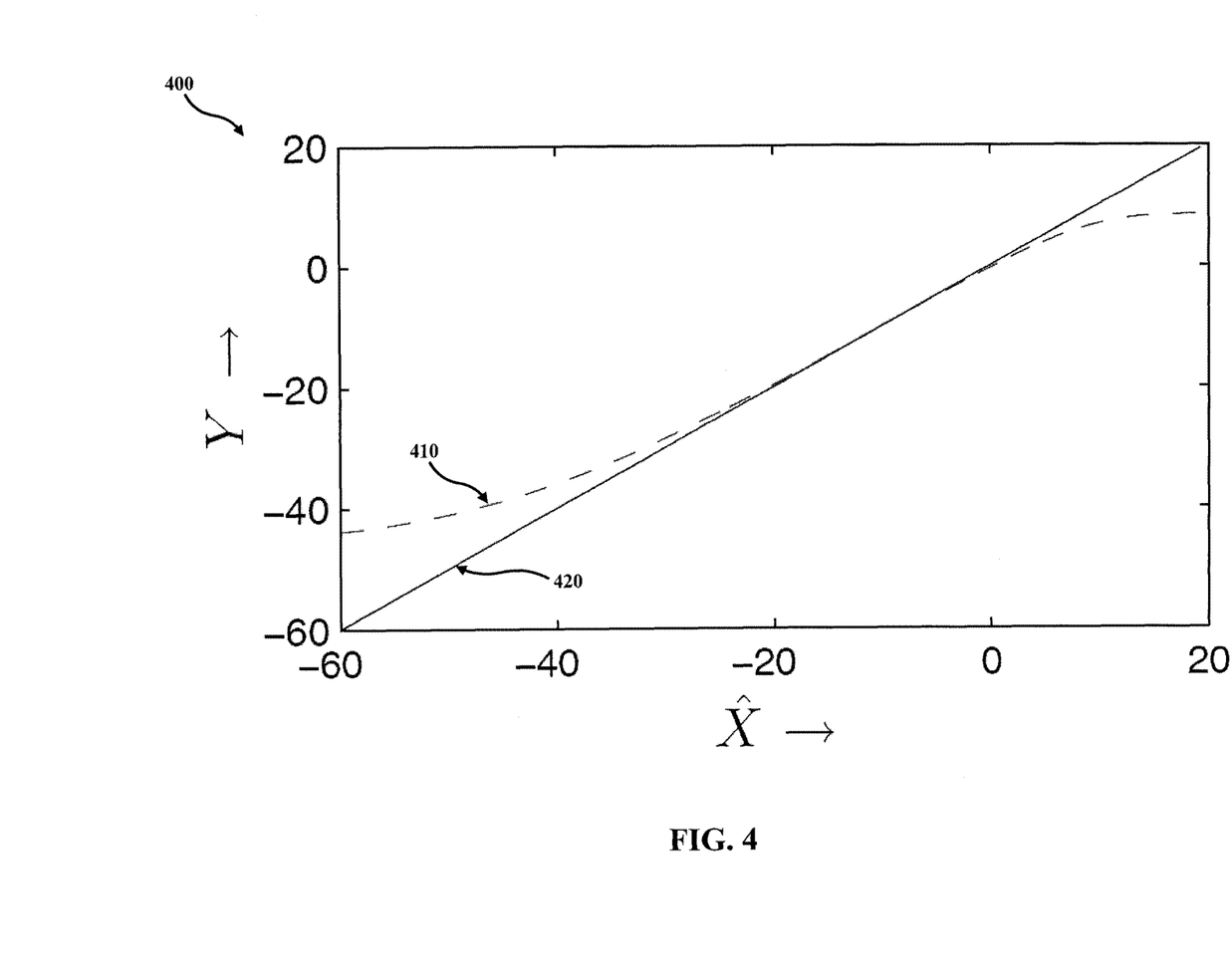
FIG. 4 is a graphical representation illustrating another example of a single channel solution for an intelligibility enhancement method according to one or more embodiments described herein.
Figure 5:
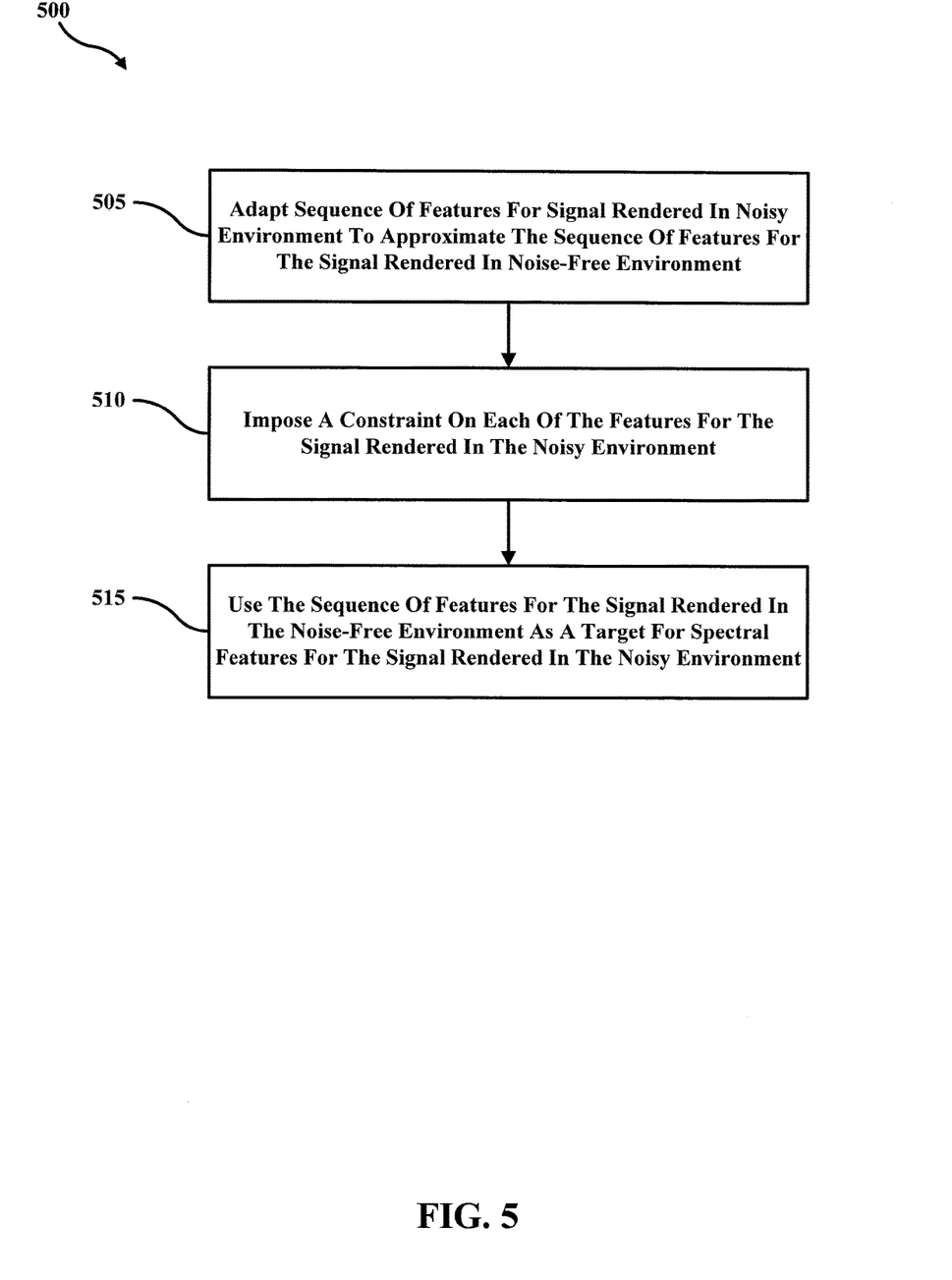
FIG. 5 is a flowchart illustrating an example method for enhancing the intelligibility of an audio signal rendered in a noisy environment according to one or more embodiments described herein.

FIG. 4 is a graphical representation illustrating an example of the relation of equation (32) in the log spectral domain (e.g., after applying the inverse mapping $f^{-1}$ to y and $\check{x}$). The solid line (420) shows Y=$\check{X}$ and the dashed line (410) shows the mapping for the case that $\lambda=5$, $\mu_1=1$, $\mu_2=0.05$, a=1, d=0.9, n=0.01, $b_0=b_1=0$. As in the first example solution (a), described above, in the present example solution it is possible to bound the output power by setting y(a) to a suitable value. However, in contrast to the first solution (a), in the present example solution the constraint forces the solution to approximate $Y=\check{X}$ over much of its range. Again the features of the rendered features X may be computed with equation (10).

(c) Uniform Distribution, Constraint on Mean Weighted Distance from Noise-Free Rendering. This example solution is similar to the case considered in the second example solution (b), described above, but with the severity of the penalty $g(x)$ increasing over the interval $[0, a]$. Thus, in accordance with at least one embodiment described herein, the problem may now be defined as: find the solution for equation (37) (presented below) with $$p(\check{x}) = \begin{cases} 1/a, & \check{x} \in [0, a] \\ 0, & \text{elsewhere} \end{cases} \tag{33}$$

$$y(0) = n + b_0 \tag{34}$$

$$y(a) = a \tag{35}$$

$$g(y) = (2 - 4\lambda\check{x}^2)(y - \check{x} - b_1)^2, \tag{36}$$

where $b_0$ and $b_1$ are again adjustable parameters that determine the strength of the low-power enhancement and the desired gain, respectively.

The Euler-Lagrange equation for this third example solution is now:

$$\lambda(-2+4\lambda\check{x}^2)y - 2\ddot{y} = \lambda(-2+4\check{x}^2)\check{x}. \tag{37}$$

A solution to the homogeneous equation is $$y_{(h)}(\check{x}) = c_0 e^{-\lambda\check{x}^2}. \tag{38}$$

A particular solution is $$y_{(p)}(\check{x}) = \check{x}. \tag{39}$$

With the boundary conditions, the solution becomes $$y(\check{x}) = \check{x} - b_1 + (n+b_0)e^{-\lambda\check{x}^2}. \tag{40}$$

The noisy signal features converge to $y=\check{x}$. Again, the features of the rendered signal may be computed with equation (10).

(d) Uniform Distribution, Weighted First Moment Constraint. This example solution is similar to the case considered in the second example solution (b), described above, but with a constraint on the weighted mean value of $y^2$ on the interval $[0, a]$. Thus, in accordance with at least one embodiment described herein, the problem may now be defined as:

$$p(\check{x}) = \begin{cases} 1/a, & \check{x} \in [0, a] \\ 0, & \text{elsewhere} \end{cases} \tag{41}$$

$$y(0) = n + b_0 \tag{42}$$

$$y(a) = d \tag{43}$$

$$g(y) = x^2 y. \tag{44}$$

For most features, as $y>0$ the bound (equation (44)) is always positive and limits the mean absolute feature value in the mapped domain.

The Euler-Lagrange equation for this fourth example solution is:

$$\lambda 2\check{x}^2 y - 2\ddot{y}(\check{x}) = 0. \tag{45}$$

The general solution of this equation is of the form $$y(\check{x}) = c_1(x^2-2)e^{\sqrt{\lambda}x} + c_2(x^2+2)e^{-\sqrt{\lambda}x}, \tag{46}$$

where $c_1$ and $c_2$ are found using the boundary conditions.

(e) Logarithmic Fidelity Weighting, Pareto Distribution, Mean Power Constraint. In this fifth example solution, the mean power is constrained and a modified fidelity criterion is used that operates in a logarithmic domain of $\check{x}$, weighted by $$\frac{ny^2}{\check{x}}.$$

The weighting of the present solution emphasizes high values of $\check{x}$, compensating for the implicit down-weighting obtained by using the logarithm. As such, the Lagrangian (equation (12), described above) is replaced by $$\Lambda(y, \check{x}) = \int \left( \frac{ny^2}{\check{x}} \left( \frac{\partial \log(y)}{\partial \log(\check{x})} - 1 \right)^2 + \lambda g(y) \right) p(\check{x}) d\check{x}, \tag{47}$$

$$= \int \left( \frac{ny^2}{\check{x}} \left( \frac{\check{x}}{y} \frac{\partial y}{\partial \check{x}} - 1 \right)^2 + \lambda g(y) \right) p(\check{x}) d\check{x}, \tag{48}$$

$$= \int \left( \frac{ny^2}{\check{x}} \left( \frac{\check{x}}{y} \dot{y} - 1 \right)^2 + \lambda g(y) \right) p(\check{x}) d\check{x}, \tag{49}$$

$$= \int \left( \frac{n}{\check{x}} (\check{x}\dot{y} - y)^2 + \lambda g(y) \right) p(\check{x}) d\check{x}, \tag{50}$$

The remaining definition of the problem is $$p(x) = \begin{cases} A\check{x}^{-\alpha} & \check{x} \in [0, \infty] \\ 0, & \check{x} < 0 \end{cases} \tag{51}$$

$$y(0) = n + b \tag{52}$$

$$y(a) = d \tag{53}$$

$$g(y) = -y^2 \tag{54}$$

where $A=(\alpha-1)x_0^{\alpha-1}$ with $x_0$ the smallest value possible for x.

The Euler-Lagrange equation for this fifth example is now:

$$2n\check{x}^2\ddot{y} + 2n(1-\alpha)\check{x}\dot{y} + 2(n(\alpha-1)-\lambda\check{x})(y-n) + 2(n(\alpha-1)-\lambda\check{x})n = 0. \tag{55}$$

The homogeneous solution for y−n is $$y - n = c_1 \sqrt{\check{x}} \, e^{2\sqrt{\frac{\lambda\check{x}}{n}}} + c_2 \sqrt{\check{x}} \, e^{-2\sqrt{\frac{\lambda\check{x}}{n}}} \tag{56}$$

It is clear that a particular solution is y−n=n. Thus, the general solution is then of the form $$y = n + c_1 \sqrt{\check{x}} \, e^{2\sqrt{\frac{\lambda\check{x}}{n}}} + c_2 \sqrt{\check{x}} \, e^{-2\sqrt{\frac{\lambda\check{x}}{n}}} \tag{57}$$

The boundary conditions show that $c_1+c_2=b$, and $$c_1\sqrt{d}\,e^{2\sqrt{\frac{\lambda}{n}a}} + c_2\sqrt{d}\,e^{-2\sqrt{\frac{\lambda}{n}a}} = d. \qquad(5)$$

By studying the behavior for b=0, it can be understood that $$c_1\left(\sqrt{d}\,e^{2\sqrt{\frac{\lambda}{n}a}} - \sqrt{d}\,e^{-2\sqrt{\frac{\lambda}{n}a}}\right) = d$$

or, for small $\lambda$, $$c_1\left(2\sqrt{d}\,\sqrt{\frac{\lambda}{n}a} + 2\sqrt{d}\,\sqrt{\frac{\lambda}{n}a}\right) = d \text{ or } c_1 = \frac{1}{2}\sqrt{\frac{dn}{\lambda a}}.$$

Enhancement Subject to an Overall Power Constraint

In accordance with one or more embodiments of the present disclosure, provided is a speech intelligibility enhancement method and system based on the notion that for any channel the condition $$\frac{dY_{\cdot,i}}{d\check{X}_{\cdot,i}} = 1 \qquad(58)$$

can be satisfied precisely for sufficiently large $\check{X}_{\cdot,i}$.

To satisfy equation (58), it is necessary to have $$Y_{\cdot,i}=\check{X}_{\cdot,i}+V_{\cdot,i} \qquad(59)$$

where $V_{\cdot,i}$ is a constant that can be both positive and negative. Independence of the noise and speech signals implies that $$X_{\cdot,i}=\log(e^{Y_{\cdot,i}}-e^{N_{\cdot,i}}). \qquad(60)$$

A condition for the (log power of the) rendered signal $X_{\cdot,i}$ for satisfying equation (58) on the interval $\check{X}_{\cdot,i}+V_{\cdot,i} \geq N_{\cdot,i}$ is then $$X_{\cdot,i}=\log(e^{\check{X}_{\cdot,i}+V_{\cdot,i}}-e^{N_{\cdot,i}}) \qquad(61)$$

The condition of equation (58) is not satisfied for $0\leq\check{X}_{\cdot,i}+V_{\cdot,i}<N_{\cdot,i}$. To make a clear improvement in intelligibility, the value $V_{\cdot,i}$ needs to be selected sufficiently large such that the impact of the range where equation (58) cannot be satisfied is small.

To minimize the impact of not satisfying the condition of equation (58) over the range $0\leq\check{X}_{\cdot,i}+V_{\cdot,i}<N_{\cdot,i}$ across all channels $i\in I$, the signal power is to be distributed optimally over all channels. A reasonable fidelity criterion to maximize is the sum over the channels of the probabilities that the condition of equation (58) holds, subject to a constraint on overall signal power (where $\check{s}_{\cdot,i}=\exp(\check{X}_{\cdot,i})$ is the spectral amplitude):

$$\underset{\{V_{\cdot,i}\}}{\operatorname{argmax}} \sum_{i\in I} P(\check{X}_{\cdot,i}+V_{\cdot,i} \geq N_{\cdot,i}), \qquad(62)$$

$$\text{subject to } \sum_{i\in I} \int_0^\infty \check{s}_{\cdot,i}^2 \exp(V_{\cdot,i})p(\check{s}_{\cdot,i})d\check{s}_{\cdot,i} = \eta.$$

Equivalently, the signal power can be minimized subject to a constraint on the fidelity (e.g., the sum of the probabilities that the condition holds):

$$\underset{\{V_{\cdot,i}\}}{\operatorname{argmax}} \sum_{i\in I} \int_0^\infty \check{s}_{\cdot,i}^2 \exp(V_{\cdot,i})p(\check{s}_{\cdot,i})d\check{s}_{\cdot,i}, \qquad(63)$$

$$\text{subject to } \sum_{i\in I} P(\check{X}_{\cdot,i}+V_{\cdot,i} \geq N_{\cdot,i}) = r.$$

In practice, the optimization problems described above should be solved with numerical methods. The following outlines an example algorithm for solving the optimization problem of equation (63), presented above, in accordance with one or more embodiments described herein.

(1) The probability distribution $p(\check{X}_{\cdot,i})$ is estimated for each frequency bin i. In accordance with at least one embodiment, the probability distribution can be estimated by approximating the probability distribution over either an utterance or over a database. The distribution may be described, for example, using a histogram or by fitting a particular distribution (e.g., the mean absolute value may be determined and used to specify a Laplacian distribution).

(2) A desired fidelity ($r_{desired}$) is defined together with an error threshold ($\delta r_{threshold}$).

(3) A step $V_d$ and a step $\delta\lambda$ are defined. In accordance with at least one embodiment, step $V_d$ and step $\delta\lambda$ should be defined to be sufficiently small for precision and sufficiently large for quick convergence.

(4) $\lambda$ is set to a positive value.

(5) All $V_{\cdot,i}$ are set equal to $V_0$, where $V_0$ is a sufficiently small value.

(6) For each frequency bin i, the Lagrangian increase is computed. In accordance with one or more embodiments, the Lagrangian increase may be computed as follows:

$$\Delta\Lambda_i = -\int_0^\infty \check{s}_{\cdot,i}^2 \exp(V_{\cdot,i}+V_d)p(\check{s}_{\cdot,i})d\check{s}_{\cdot,i} + \int_0^\infty \check{s}_{\cdot,i}^2 \exp(V_{\cdot,i})p(\check{s}_{\cdot,i})d\check{s}_{\cdot,i} + \lambda P(\check{X}_{\cdot,i}+V_{\cdot,i}+V_d \geq N_{\cdot,i}) - \lambda P(\check{X}_{\cdot,i}+V_{\cdot,i} \geq N_{\cdot,i}) \qquad(64)$$

(7) A determination is made as to the frequency bin i with the largest increase $\Delta\Lambda_i>0$. Once this determination is made, then $V_{\cdot,i}\to(V_{\cdot,i}+V_d)$. If it is determined that the largest increase $\Delta\Lambda_1>0$, then the algorithm may return to step (5).

(8) A fidelity measure is computed. For example, in accordance with at least one embodiment, the fidelity measure r may be computed from equation (63), which is described above.

(9) The difference between the fidelity measure (r) computed at step (7) and the desired fidelity ($r_{desired}$) defined at step (2) are compared to the error threshold ($\delta r_{threshold}$) also defined at step (2). In accordance with at least one embodiment, if $|r_{desired}-r|\leq\delta r_{threshold}$, then the algorithm may end.

(10) If it is determined that $r>r_{desired}$, then the value of $\lambda$ may be incremented. On the other hand, if it is instead determined that r is not greater than $r_{desired}$, then the value of $\lambda$ may be decremented.

EXAMPLE

To further illustrate the various features of the speech intelligibility enhancement methods and systems of the present disclosure, the following describes some example results that may be obtained through experimentation. It should be understood that although the following provides example results obtained using the third example method (c) (Uniform Distribution, Constraint on Mean Weighted Distance from Noise-Free Rendering), described above, the scope of the present disclosure is not limited to this approach, and example experimental results may also be obtained using any of the other example methods described.

For signal modification, a setup with 32 bands linearly-spaced on a Mel scale in the range [100, 7500] Hz is used, corresponding to the spectral range of the signals in the development database. The sampling frequency is set to 16 kHz. An analysis frame length of 12 milliseconds (ms) and an update length of 10 ms are used. The analysis window is tapered in the overlap regions with a Hanning window. Zero-padding to 2048 samples is performed. The band-power densities are approximated using K=100 levels.

To estimate the band-power statistics of natural speech, 160 sentences from a known sentence database are used. Two types of additive noise may be considered: speech-shaped (SSN) and multi-speaker babble (BBL). The a-priori SNR in the presented experiments is −6 dB. A single estimate of the noise power spectral density (PSD) is obtained, in the desired resolution, for use in the rendering algorithm from the first 500 ms of the noise recording assigned to each test sentence. In practice the noise PSD estimate can be updated arbitrarily often.

The reference method (PD) is set to operate at a system delay of one frame, where the frame length is 32 ms and the update length is 16 ms. As the SDP method modifies the SNR, the power of the natural speech signal is equalized to the output power of the (SDP) modified signal to ensure fair comparison. Similarly, the reference system output is obtained from processing the re-scaled natural speech signal.

The raw intelligibility scores are presented in TABLE I, below.

TABLE I

RAW INTELLIGIBILITY SCORES (SENTENCE SET NUMBER AS INDEX)

| noise | SSN | | | BBL | | |
|---|---|---|---|---|---|---|
| sbj | Nat. | PD | SDP | Nat. | PD | SDP |
| 1 | $0.52_{55}$ | $0.54_{56}$ | $0.64_{57}$ | $0.42_{58}$ | $0.55_{59}$ | $0.59_{60}$ |
| 2 | $0.25_{57}$ | $0.55_{55}$ | $0.59_{56}$ | $0.27_{60}$ | $0.56_{58}$ | $0.62_{59}$ |
| 3 | $0.47_{56}$ | $0.66_{57}$ | $0.84_{55}$ | $0.44_{59}$ | $0.67_{60}$ | $0.54_{58}$ |
| 4 | $0.70_{58}$ | $0.77_{59}$ | $0.91_{60}$ | $0.54_{55}$ | $0.64_{56}$ | $0.67_{57}$ |
| 5 | $0.38_{60}$ | $0.48_{58}$ | $0.68_{59}$ | $0.14_{57}$ | $0.46_{55}$ | $0.38_{56}$ |
| 6 | $0.54_{59}$ | $0.61_{60}$ | $0.61_{58}$ | $0.11_{56}$ | $0.25_{57}$ | $0.55_{55}$ |

The subjective recognition scores are compared in a per-set basis in Table II, below.

TABLE II

INTELLIGIBILITY SCORES AFTER PROFICIENCY NORMALIZATION

| noise | SSN | | | BBL | | |
|---|---|---|---|---|---|---|
| sentence set | Nat. | PD | SDP | Nat. | PD | SDP |
| 55 | 0.81 | 0.89 | 1 | 0.59 | 0.68 | 0.90 |
| 56 | 0.56 | 0.84 | 0.95 | 0.18 | 0.70 | 0.56 |
| 57 | 0.40 | 0.79 | 1 | 0.21 | 0.41 | 0.74 |
| 58 | 0.77 | 0.71 | 1 | 0.66 | 0.9 | 0.64 |
| 59 | 0.89 | 0.85 | 1 | 0.52 | 0.86 | 1 |
| 60 | 0.56 | 1 | 1 | 0.44 | 0.8 | 0.92 |
| mean | 0.66 | 0.84 | 0.99 | 0.43 | 0.72 | 0.79 |
| std | 0.17 | 0.09 | 0.02 | 0.18 | 0.16 | 0.16 |

To mitigate the effect of the inconsistent language proficiency of the subjects, the scores are normalized for each subject by their best per-set recognition score. The significance analysis of the normalized scores is shown in Table III, using the conservative Wilcoxon signed rank test. The results indicate a significant improvement in intelligibility over natural speech (Nat.) and the speech processed by the reference method (SSN condition only) despite the low number of subjects.

TABLE III

SIGNIFICANCE ANALYSIS (WILCOXON'S SIGNED RANK TEST)

| SSN | Nat. | PD | SDP | BBL | Nat. | PD | SDP |
|---|---|---|---|---|---|---|---|
| Nat. | 1 | 0.16 | 0.03 | Nat. | 1 | 0.03 | 0.06 |
| PD | — | 1 | 0.06 | PD | — | 1 | 0.69 |
| SDP | — | — | 1 | SDP | — | — | 1 |

The methods and systems of the present disclosure demonstrate that speech intelligibility can be interpreted as the probability of being able to decode the original message correctly. Using representations commonly used in speech recognition, the techniques provided herein approximate this probability by a distance from features describing the dynamics of the features for a rendering in a noise-free environment. The resulting methods and systems can be fine-tuned by overstating or understating the noise in a particular frequency bin. The resulting system provides significant enhancement of speech intelligibility.

Figure 6:
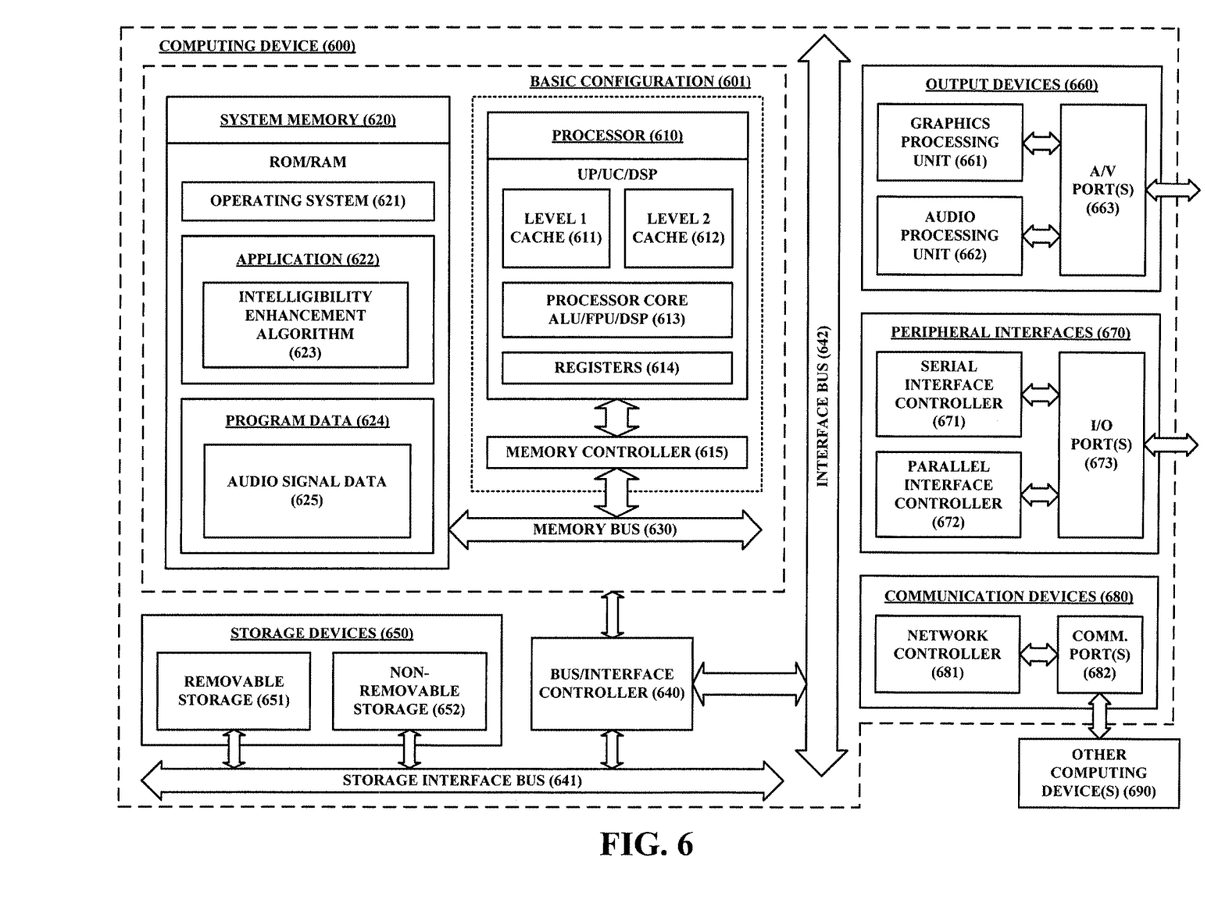
FIG. 6 is a block diagram illustrating an example computing device arranged for enhancing the intelligibility of an audio signal rendered in a noisy environment according to one or more embodiments described herein.

FIG. 6 is a block diagram illustrating an example computing device 600 that is arranged for enhancing the intelligibility of an audio (e.g., speech) signal rendered in a noisy environment in accordance with one or more embodiments of the present disclosure. For example, computing device 600 may be configured to iteratively run an intelligibility enhancement algorithm performs nonlinear mappings on features of the noisy signal and the signal under noise-free conditions, as described above. In a very basic configuration 601, computing device 600 typically includes one or more processors 610 and system memory 620. A memory bus 630 may be used for communicating between the processor 610 and the system memory 620.

Depending on the desired configuration, processor 610 can be of any type including but not limited to a microprocessor (µP), a microcontroller (µC), a digital signal processor (DSP), or any combination thereof. Processor 610 may include one or more levels of caching, such as a level one cache 611 and a level two cache 612, a processor core 613, and registers 614. The processor core 613 may include an arithmetic logic unit (ALU), a floating point unit (FPU), a digital signal processing core (DSP Core), or any combination thereof. A memory controller 615 can also be used with the processor 610, or in some embodiments the memory controller 615 can be an internal part of the processor 610.

Depending on the desired configuration, the system memory 620 can be of any type including but not limited to volatile memory (e.g., RAM), non-volatile memory (e.g., ROM, flash memory, etc.) or any combination thereof. System memory 620 typically includes an operating system 621, one or more applications 622, and program data 624. In at least some embodiments, application 622 includes an intelligibility enhancement algorithm 623 that is configured to map a set of signal (spectral) features produced under noise-free conditions into a set of signal (spectral) features that are effective under noisy conditions. The intelligibility enhancement algorithm 623 may be configured to utilize features that reflect the operation of the human auditory system. A range of constraints may also be imposed on the feature sets, either individually or globally.

Program Data 624 may include audio data 625 that is useful for enhancing the intelligibility of a speech signal rendered in a noisy environment. In some embodiments, application 622 can be arranged to operate with program data 624 on an operating system 621 such that the intelligibility enhancement algorithm 623 uses the audio data 625 to approximate the maximization of the decoding probability with the maximization of the similarity of the spectral dynamics of the noisy speech to the spectral dynamics of the corresponding noise free speech, as described above.

Computing device 600 can have additional features and/or functionality, and additional interfaces to facilitate communications between the basic configuration 601 and any required devices and interfaces. For example, a bus/interface controller 640 can be used to facilitate communications between the basic configuration 601 and one or more data storage devices 650 via a storage interface bus 641. The data storage devices 650 can be removable storage devices 651, non-removable storage devices 652, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of computing device 600.

Computing device 600 can also include an interface bus 642 for facilitating communication from various interface devices (e.g., output interfaces, peripheral interfaces, communication interfaces, etc.) to the basic configuration 601 via the bus/interface controller 640. Example output devices 660 include a graphics processing unit 661 and an audio processing unit 662, either or both of which can be configured to communicate to various external devices such as a display or speakers via one or more A/V ports 663. Example peripheral interfaces 670 include a serial interface controller 671 or a parallel interface controller 672, which can be configured to communicate with external devices such as input devices (e.g., keyboard, mouse, pen, voice input device, touch input device, etc.) or other peripheral devices (e.g., printer, scanner, etc.) via one or more I/O ports 673.

An example communication device 680 includes a network controller 681, which can be arranged to facilitate communications with one or more other computing devices 690 over a network communication (not shown) via one or more communication ports 682. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It should also be noted that in situations in which the systems and methods described herein may collect personal information about users, or may make use of personal information, the users may be provided with an opportunity to control whether programs or features associated with the systems and/or methods collect user information (e.g., information about a user's preferences). In addition, certain data may be treated in one or more ways before it is stored or used, so that personally identifiable information is removed. For example, a user's identity may be treated so that no personally identifiable information can be determined for the user. Thus, the user may have control over how information is collected about the user and used by a server.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for enhancing intelligibility of a speech signal rendered in a noisy environment, the method comprising:
adapting a sequence of features for a signal rendered in a noisy environment to approximate the sequence of features for the signal rendered in a noise-free environment;
imposing a constraint on each of the features for the signal rendered in the noisy environment,
defining a fidelity measure to approximate the sequence of features for the signal rendered in the noisy environment to correspond with the sequence of features for the signal rendered in the noise-free environment; and
distributing signal power across frequency bins of the adapted sequence of features to maximize the fidelity measure.

2. The method of claim 1, wherein the sequence of features for the signal rendered in the noise-free environment is a sequence of spectral features, and further comprising:
using the sequence of spectral features for the signal rendered in the noise-free environment as a target for spectral features for the signal rendered in the noisy environment.

3. The method of claim 1, further comprising adjusting a fixed gain of each frequency band of the signal to maximize intelligibility given the environmental noise, subject to a power constraint.

4. The method of claim 1, wherein a spectrum of the signal rendered in the noisy environment is a compressed version of the signal rendered in the noise-free environment, and wherein the compression is optimized for each frequency band of the signal over time.

5. The method of claim 1, wherein the sequence of features are discrete log spectra or discrete linear spectra.

6. The method of claim 1, wherein a change in the sequence of features for the signal rendered in the noise-free environment corresponds to a change in the sequence of features for the signal rendered in the noisy environment.

7. A system for enhancing intelligibility of a speech signal rendered in a noisy environment, the system comprising:
one or more processors; and
a non-transitory computer-readable medium coupled to said one or more processors having instructions stored thereon that, when executed by said one or more processors, cause said one or more processors to perform operations comprising:
adapting a sequence of features for a signal rendered in a noisy environment to approximate the sequence of features for the signal rendered in a noise-free environment; and
imposing a constraint on each of the features for the signal rendered in the noisy environment
defining a fidelity measure to approximate the sequence of features for the signal rendered in the noisy environment to correspond with the sequence of features for the signal rendered in the noise-free environment; and
distributing signal power across frequency bins of the adapted sequence of features to maximize the fidelity measure.

8. The system of claim 7, wherein the sequence of features for the signal rendered in the noise-free environment is a sequence of spectral features, and wherein the one or more processors are caused to perform further operations comprising:
using the sequence of spectral features for the signal rendered in the noise-free environment as a target for spectral features for the signal rendered in the noisy environment.

9. The system of claim 7, wherein the one or more processors are caused to perform further operations comprising:
adjusting a fixed gain of each frequency band of the signal to maximize intelligibility given the environmental noise, subject to a power constraint.

10. The system of claim 7, wherein a spectrum of the signal rendered in the noisy environment is a compressed version of the signal rendered in the noise-free environment and wherein the compression is optimized for each frequency band of the signal over time.

* * * * *